G. C. KIDDER.
SEPARATING SCREEN.
APPLICATION FILED MAR. 8, 1909.

951,082.

Patented Mar. 1, 1910.
2 SHEETS—SHEET 1.

Witnesses:
Jas. E. Hutchinson
Tho. R. Trash

Inventor:
George C. Kidder,
By Jas. A. Hunter Attorney.

UNITED STATES PATENT OFFICE.

GEORGE C. KIDDER, OF SALT LAKE CITY, UTAH.

SEPARATING-SCREEN.

951,082.   Specification of Letters Patent.   Patented Mar. 1, 1910.

Application filed March 8, 1909. Serial No. 482,000.

*To all whom it may concern:*

Be it known that I, GEORGE C. KIDDER, a citizen of the United States of America, residing at Salt Lake City, in the county of Salt Lake and State of Utah, have invented certain new and useful Improvements in Separating-Screens, of which the following is a specification, reference being had therein to the accompanying drawing.

This invention relates to an improvement in separating screens and more particularly to an improvement in screens intended to be used especially for the separation of ore and coal.

The primary object of the present invention is the provision of a screen of this character which cannot become clogged regardless of the amount of use to which it may be subjected, the screen acting automatically at intervals to discharge any particles of material which may become clogged in the interstices of the screen at the discharge point thereof.

A further object of the invention is the provision of a screen of this character of a strong and durable construction.

Other objects of the invention will be apparent from the detailed description hereinafter when read in connection with the accompanying drawings forming a part hereof, wherein a convenient embodiment of the invention is illustrated and wherein like letters of reference refer to similar parts in the several views.

Figure 1:
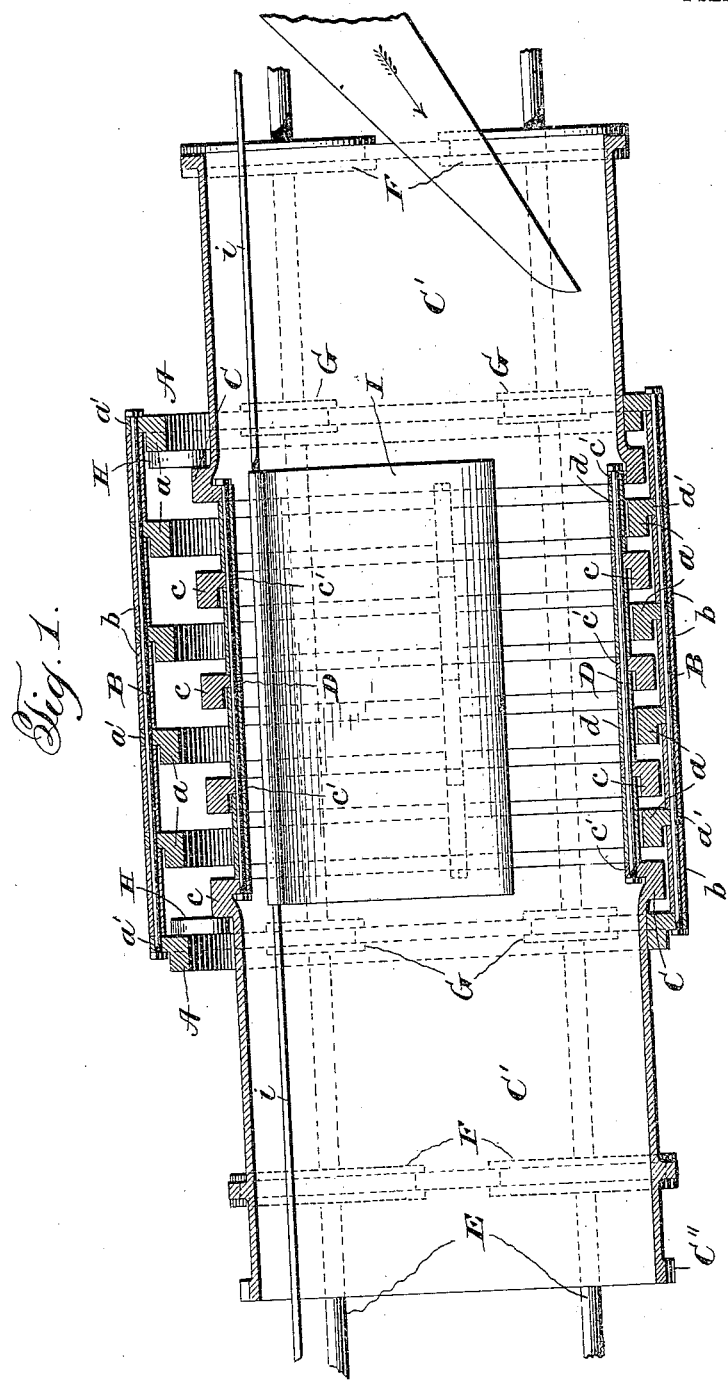
Figure 2:
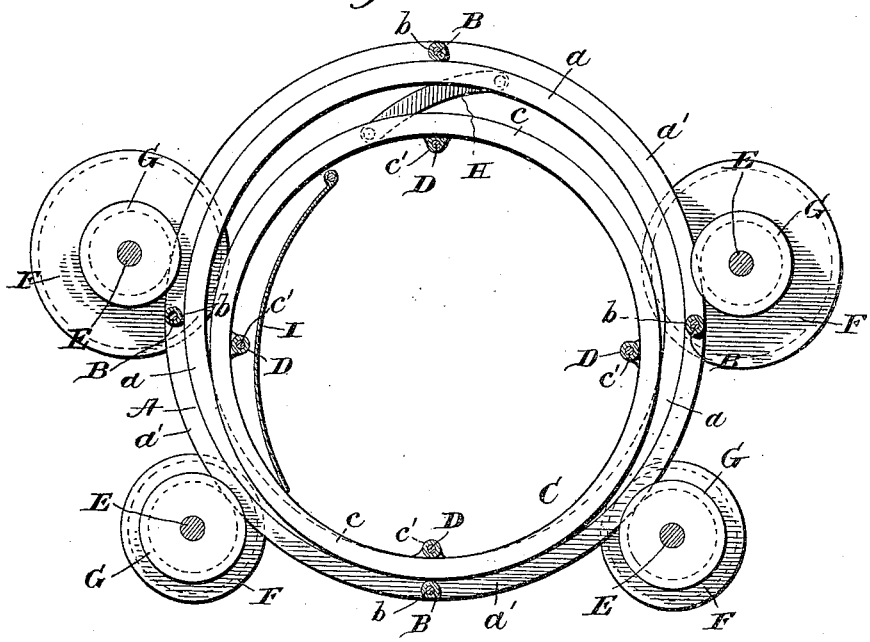
Figure 3:
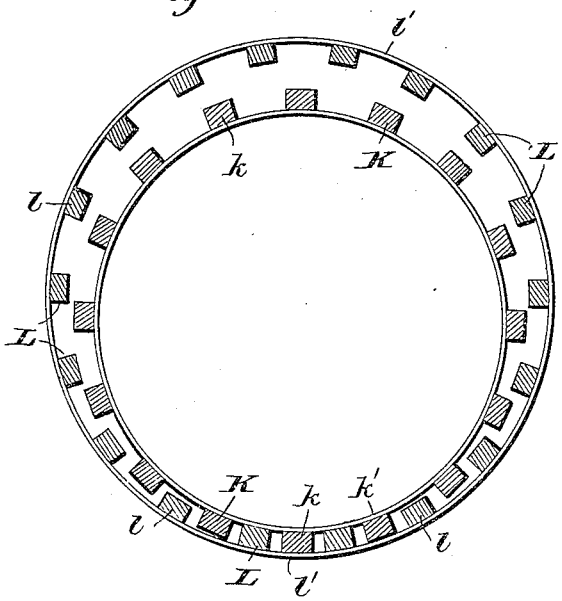

In the drawings, Figure 1 is a longitudinal section of my improved screen, Fig. 2 is a cross section of the same, Fig. 3 is a cross section of a modified form of the invention.

Referring now more particularly to the drawings A designates a cylindrical screen which is made up of a plurality of regularly spaced bars $a$ which extend circumferentially thereof. Any desired means may be used for securing the members $a$ together in their proper relation to make up the screen, but in the embodiment of the invention illustrated in the drawings, a plurality of longitudinal tie rods B are used for this purpose, said rods extending full length of the screen and passing through lugs $a'$ formed at intervals on the outer surfaces of the circular members $a$ of the screen A. The proper distance is maintained between the circular members $a$ of the screen by means of spacing sleeves $b$, which are positioned on the tie rods B between the ears $a'$ of the several members $a$. Positioned within the screen A is a second cylindrical screen C, which is made up of a plurality of spaced rings or circular members $c$, which members are secured together by tie rods D which extend the full length of the screen and pass through lugs $c'$ formed at intervals on the inner surfaces of the rings or circular members $c$, said rings being held in the proper spaced relation by means of spacing sleeves $d$ positioned on the tie rods D between the lugs $c'$ of the several members $c$.

The screen C is positioned eccentrically within the screen A, with the lower portions of the circular members $c$ thereof positioned between the lower portions of the circular members $a$ of the screen A and in substantially the same plane therewith, and as the screens are both mounted so as to rotate on their longitudinal axes, it will be seen that this relations will always be maintained between the circular members $c$ and $a$ at the lower or discharge portion of the screen, the material being discharged through the spaces formed between the circular members $a$ of the screen A and the circular members $c$. During the rotation of the screens A and C, the circular members $c$ of the screen C pass into and out of mesh with the circular members $a$ of the screen A, the lower portions of said members lying in substantially the same plane, while the upper portions of the members are, owing to the difference in diameter of the two screens some distance apart. From this construction it will be apparent that should any material clog between the circular members $c$ and $a$ at the bottom or discharge point of the screen, such material would be released during the continued movement of the screen and permitted to fall back into the inner screen C, the screen being thus self-clearing. The inner screen C is provided with imperforate cylindrical extensions $C'$ extending from the ends thereof outwardly beyond the ends of the outer screen A, said cylindrical extension serving to permit the admission and discharge of the material to be separated into and out of the screen. Any convenient means may be employed for supporting the screens A and C so that each is rotatable on its own axis, the screens in the embodiment of the invention illustrated in the drawings being supported by groups of circumferentially arranged guide pulleys which engage annular bearing rings upon the ends of the screens. Such bearing pulleys are loosely mounted on shafts E which are disposed around the peripheries of the screens and which extend parallel with the longitudinal axes thereof. Rollers F are loosely mounted on said shafts which are grooved to engage bearing rings carried by the cylindrical extension C' of the screen C, and rollers G are loosely mounted on the same shafts which engage annular bearing rings secured upon the outer ends of the screen A, the sizes of the rollers F and G being such that the screens A and C will be held in the relation heretofore described. The screens A and C are connected at the ends thereof by links H so that they will rotate together, and any desired means may be employed for imparting a rotary movement to the coupled screens. In the embodiment of the invention illustrated in the drawings one of the extensions C' of the inner screen C is shown as provided with a gear C'', which is adapted to be engaged by a driving gear of any suitable construction.

To prevent the material in the screen from falling between the spaces between the members $a$ and $c$ of the screens A and C before such members have been brought into proper mesh, an apron I is positioned on the interior of the screen C at the downwardly rotating side thereof. The apron I is preferably formed of sheet metal and extends the full length of the screen C, the upper end of said apron being pivoted to a shaft $i$ which is fixedly secured in the upper portion of the screen and the lower end of said apron resting upon the inner surface of the screen C adjacent the bottom thereof.

While the screens A and C have been described as formed of a plurality of spaced ring members, it is obvious that they may be formed in many other ways and in Fig. 3 of the drawings is shown a cross section of a modified form of the invention in which inner and outer screens K and L are employed, which are made up of a plurality of spaced bars $k$ and $l$, which extend longitudinally of the screens, the bars $l$ of the outer screen being secured together and held in their proper positions by means of members $l'$ which extend circumferentially around the screen on the outer surface thereof, and the bars $k$ being secured together and held in their proper positions by members $k'$ which extend circumferentially around the screen L on the inner surface thereof.

While a convenient embodiment of the invention is illustrated in the accompanying drawings, it is obvious that many changes may be made in the form and construction therein shown without departing from the spirit of the invention as defined in the appended claims.

I claim as my invention—

1. In a device of the character described, a screen member, and a second screen member, the imperforate portions of which are adapted to lie within the perforate portions of the first mentioned screen member at all times throughout the discharge portion only thereof.

2. In a device of the character described, a pair of movable screen members, the imperforate portions of one of said members being adapted to lie within the perforate portions of the other of said members at all times throughout the discharge portion only thereof.

3. In a device of the character described, a pair of rotatable screen members positioned one within the other the imperforate portions of one of said members being adapted to lie within the perforate portions of the other of said members at all times during a portion only of the rotation of the members.

4. A device of the character described comprising a rotatable screen member having abnormally large interstices and means for partially obstructing the interstices throughout the discharge portion of the screen only at all times during its operative movement, said means permitting said interstices to be free of obstruction throughout all other portions of said screen.

5. A device of the character described comprising a rotatable cylindrical screen formed of a plurality of spaced members, a second rotatable cylindrical screen of smaller diameter positioned within said first mentioned screen and formed of a plurality of spaced members, the members of said second screen lying between the spaced members of the first screen at the point of discharge of the screen.

6. A device of the character described comprising a rotatable cylindrical screen formed of a plurality of spaced members, a second rotatable cylindrical screen formed of a plurality of spaced members eccentrically mounted in said first mentioned screen, the portions of the spaced members of said screens at the discharge point of the screens lying in substantially the same plane.

7. A device of the character described comprising a cylindrical screen member formed of spaced bars a second cylindrical screen member of smaller diameter than the first screen member rotatably mounted within the same and formed of a plurality of spaced bars, the bars of said screen members intermeshing at the point of discharge of the screen.

8. A device of the character described comprising a cylindrical screen member formed of spaced bars, a second cylindrical screen member formed of spaced bars eccentrically mounted within the first mentioned screen with the spaced bars thereof in mesh with the spaced bars of the first mentioned screen member, and a connection between said screen members.

9. In a device of the character described, a rotatable screen member, a second rotatable screen member eccentrically mounted within said first mentioned screen member, the imperforate portions of one of said screens being arranged opposite the perforate portion of the other of said screens, and an apron positioned within the inner screen at one side thereof, the lower end of said apron extending in proximity to the discharge point of the screen.

In testimony whereof I affix my signature in presence of two witnesses.

GEORGE C. KIDDER.

Witnesses:
PEARL DURNELL,
WM. CROME.